Patented Nov. 20, 1934

1,981,301

UNITED STATES PATENT OFFICE 1,981,301

COMPOUNDS OF THE CARBAZOLE SERIES

Alfred Bergdolt, Cologne-on-the-Rhine, and Albert Schmelzer, Cologne-Mulheim, Germany, assignors to General Aniline Works, Inc., New York, N. Y., a corporation of Delaware No Drawing. Application April 5, 1933, Serial No. 664,666. In Germany April 13, 1932

9 Claims. (Cl. 260—46)

The present invention relates to compounds of the carbazole series, and to a process of preparing the same, more particularly it relates to carbazole compounds which may be represented by the probable general formula:

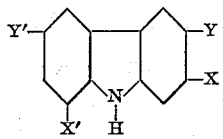

wherein "X" and "X'" stand both for hydroxyl or both for the sulfonic acid group, "Y" and "Y'" stand both for hydrogen or both for the sulfonic acid group.

According to our invention the carbazole-2,3,6,8-tetra-sulfonic acid is prepared by treating carbazole at moderate temperature, say between about 10 and about 75° C., with such a sulfonating agent, as is capable of chemically binding immediately the water formed in the reaction, and with at least such a quantity of the sulfonating agent that all the water liberated in the reaction is chemically bound; suitable sulfonating agents are, for example, sulfuric acid containing sulfur trioxide or another agent capable of chemically binding the water without causing side-reactions, for example, phosphorus pentoxide.

A modification of the process resides in dissolving carbazole in sulfuric acid monohydrate at a temperature at which a sulfonation does not as yet enter and then mixing this solution with sulfuric acid containing $SO_3$ or an other suitable water binding agent. As stated above, the process can be performed at relative low temperatures, and it is complete after a short time, the details being more fully given in the annexed examples.

When sulfonating carbazole according to the methods hitherto known, the sulfonic acid groups enter some preferred positions of the carbazole nucleus, i. e. the 1-, 3-, 6- and 8-positions, even, when performing the sulfonation by dissolving carbazole in sulfuric acid of 66° Bé. or in monohydrate and then adding sulfuric acid containing $SO_3$ (compare for example German Patents 258,298; 224,952; 507,797; 511,021).

However, when performing the sulfonation according to the invention, for example, by introducing the carbazole into sulfuric acid containing $SO_3$, a sulfonic acid group enters a meta-position with respect to the imino group, yielding by exhaustive sulfonation a carbazole-tetrasulfonic acid of the following formula:

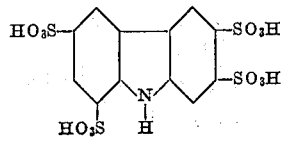

A further step of our invention resides in successively substituting the sulfonic acid groups in the 2- and in the 8-positions by hydroxy groups by melting with caustic alkali, and, if desired, splitting off the sulfonic acid groups of the hydroxycarbazoles formed according to methods known per se, for example, by heating with a dilute aqueous mineral acid under superatmospheric pressure (compare for example British Patent 320,641). In accordance with our invention we have found that by subjecting the carbazole-2,3,6,8-tetrasulfonic acid to a caustic alkali melt, for example, at temperatures between about 180° and about 200° C., only the sulfonic acid group in the 2-position is split off with the formation of the 2-hydroxycarbazole-3,6,8-trisulfonic acid. The same hydroxycarbazole-trisulfonic acid is also obtained by melting the tetrasulfonic acid with an aqueous caustic alkali under superatmospheric pressure, say at temperatures between about 225° and about 280° C. By heating this trisulfonic acid with dilute aqueous mineral acids and under superatmospheric pressure, the three sulfonic acid groups can be split off, whereby the technically valuable 2-hydroxycarbazole is obtained.

On subjecting the 2-hydroxycarbazole-3,6,8-trisulfonic acid to a caustic alkali melt at temperatures above about 200° C., say between about 200° and 260° C., the sulfonic acid group in the 8-position is substituted by the hydroxy group, yielding the hitherto unknown 2,8-dihydroxycarbazole-3,6-disulfonic acid; by heating the same with a dilute mineral acid under superatmospheric pressure, the two sulfonic acid groups are split off, yielding the 2,8-dihydroxycarbazole.

It is to be mentioned that on melting the carbazole-2,3,6,8-tetrasulfonic acid with caustic alkalies at temperatures above about 200° C., say up to about 260° C., the two sulfonic acid groups in the 2- and 8-positions are substituted by hydroxy groups, and that this modification of preparing the new 2,8-dihydroxycarbazole-3,6-disulfonic acid falls within the scope of our invention.

The new carbazole compounds obtainable in accordance with our invention are valuable intermediate products in the manufacture of dyestuffs.

The invention is illustrated by the following examples, without being limited thereto:

*Example 1.*—335 grams of carbazole are introduced into 2 kgs of sulfuric acid containing 40% of $SO_3$ at a temperature between 20 and 70° C. and in the course of about 30 minutes. After cooling to about 30° C., the same is poured onto ice, the free acid is neutralized by the addition of lime, and after filtering the whole, is evaporated to about 12 litres. The calcium salt of the tetrasulfonic acid of the following formula:

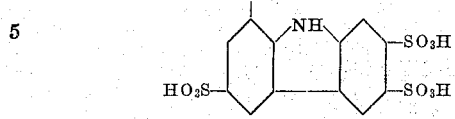

is transformed into the potassium salt by the addition of 570 grams of potassium carbonate. The calcium carbonate separated is filtered off, and the filtrate is evaporated to dryness. The potassium salt thus obtained can be recrystallized from some water in rhombic needles. The free acid can be prepared by transforming the potassium salt into the difficultly soluble barium salt, decomposing the same by the addition of the theoretical quantity of surfuric acid, and evaporating the aqueous solution of the free acid to dryness. The free acid crystallizes in hygroscopic needles which are soluble in alcohol and acetone. The free acid crystallizes from the sulfonation mixture and can also be obtained by directly filtering the sulfonation mixture as obtained.

*Example 2.*—100 grams of carbazole are introduced in the course of 20 minutes into 1440 grams of a sulfuric acid containing 20% of $SO_3$ at a temperature between 20 and 30° C. The working up is performed as described in Example 1. Yield 390 grams of carbazole-2,3,6,8-tetra-potassium sulfonate.

*Example 3.*—167 grams of carbazole are dissolved in 1000 grams of sulfuric acid monohydrate at a temperature below 10° C. and in the course of 5 minutes. Thereto are added in the course of 30 minutes and at a temperature between 20 and 30° C. 750 grams of sulfuric acid containing 65% of $SO_3$. The working up is performed as described in Example 1. Yield 610 grams of carbazole-2,3,6,8-tetra-potassium sulfonate.

*Example 4.*—Into a suspension of 425 grams of phosphorus pentoxide in 1000 grams of sulfuric acid monohydrate 100 grams of carbazole are stirred at a temperature between 30 and 40° C. in the course of 18 minutes, and the reaction mixture is kept for about 1 hour at 40 to 55° C. The working up is performed as described in Example 1. Yield 387 grams of carbazole-2,3,6,8-tetra-potassium sulfonate.

*Example 5.*—150 parts by weight of carbazole-2,3,6,8-tetra-potassium sulfonate are introduced into 300 parts by weight of potassium hydroxide and at a temperature between 100 and 130° C.; the temperature is then raised to 175 to 185° C. and kept at this temperature for about 1½ hours. After cooling, the melt is dissolved in 750 parts by weight of water. Some undissolved matter is filtered, and the filtrate is acidified by the addition of 675 parts by weight of crude hydrochloric acid. After boiling off the sulfurous acid, the potassium salt of 2-hydroxycarbazole-3,6,8-trisulfonic acid, said acid having the following formula:

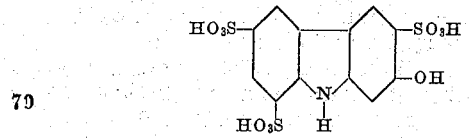

crystallizes on cooling in colorless lancets.

*Example 6.*—100 parts by weight of carbazole-2,3,6,8-tetra-potassium sulfonate are introduced into 200 parts by weight of caustic potassium and 40 parts by weight of water at a temperature of 100 to 130° C. Then the temperature is raised to 230 to 240° C. and kept at this temperature for 1½ to 2 hours. The yellowish colored melt is dissolved in about 500 parts by weight of water after cooling, some undissolved matter is filtered, and the filtrate is rendered acid to congo by the addition of 450 parts by weight of crude hydrochloric acid. After boiling off the sulfurous acid, the 2.8-dihydroxycarbazole-3.6-disulfonic acid of the formula:

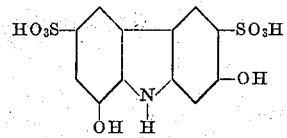

separates on standing in form of the potassium salt.

Instead of starting with the carbazole-2,3,6,8-tetra-potassium sulfonate there may be used the 2-hydroxycarbazole-3,6,8-tripotassium sulfonate.

When heating the 2,8-dihydroxycarbazole-3,6-disulfonic acid with aqueous dilute mineral acid and under superatmospheric pressure, there is obtained the hitherto unknown 2,8-dihydroxycarbazole of the formula:

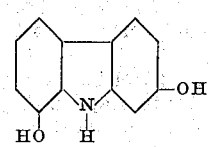

crystallizing from xylene or dichlorobenzene in colorless needles of the melting point 246 to 247° C.

*Example 7.*—Carbazole-2,3,6,8 - tetra - potassium sulfonate, prepared from 167 grams of carbazole according to Example 3, is heated with 600 grams of an aqueous caustic soda lye of 30% strength in an autoclave, provided with a stirrer, for 24 hours at 240 to 250° C., whereby the pressure raises to 28 to 29 atmospheres. The melt is poured into hydrochloric acid, and after eliminating the sulfurous acid by stirring, the solution is cooled to 20° C.; the 2-hydroxy-carbazole-3,6,8-tripotassium sulfonate which has crystallized out from the solution is filtered with suction and washed with a 15% aqueous hydrochloric acid. Yield 85% of theory.

We claim:

1. As new products carbazole compounds of the general formula:

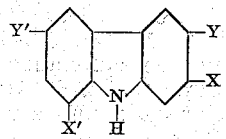

wherein "X" and "X'" stand both for a sulfonic acid group or both for a hydroxy group, and "Y" and "Y'" stand both for hydrogen or both for a sulfonic acid group, being soluble in alkalies and organic solvents and being valuable intermediate products in the manufacture of dyestuffs.

2. As a new product the carbazole compound of the following formula:

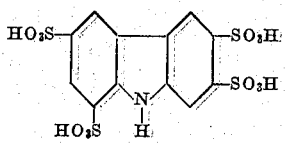

crystallizing in hygroscopic needles, being soluble in organic solvents, forming well crystallizing alkali metal salts and being a valuable intermediate product in the manufacture of dyestuffs.

3. As new products carbazole compounds of the general formula:

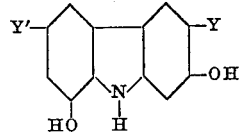

wherein "Y" and "Y'" stand both for hydrogen or both for the sulfonic acid group, being soluble in alkalies and organic solvents and being valuable intermediate products in the manufacture of dyestuffs.

4. As a new product the carbazole compound of the following formula:

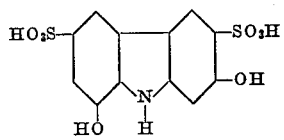

forming well crystallizing alkali metal salts which are difficultly soluble in water, and being a valuable intermediate product in the manufacture of dyestuffs.

5. As a new product the carbazole compound of the following formula:

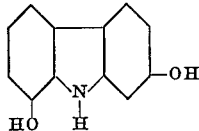

being a well crystallizing substance of the melting point 246 to 247° C., and being a valuable intermediate product in the manufacture of dyestuffs.

6. In the process of preparing carbazole compounds of the general formula:

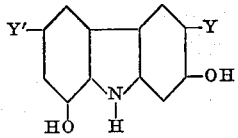

wherein "Y" and "Y'" stand both for hydrogen or both for a sulfonic acid group, the step which comprises sulfonating carbazole at a temperature between about 10° and about 75° C. with a sulfuric acid containing a water-binding agent at least in a quantity sufficient for binding the water liberated in the reaction.

7. In the process of preparing carbazole compounds of the general formula:

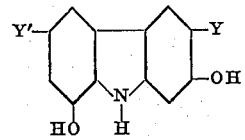

wherein "Y" and "Y'" stand both for hydrogen or both for a sulfonic acid group, the step which comprises sulfonating carbazole at a temperature between about 10° and about 75° C. with sulfuric acid containing $SO_3$ at least in a quantity sufficient for binding the water liberated in the reaction.

8. In the process of preparing carbazole compounds of the general formula:

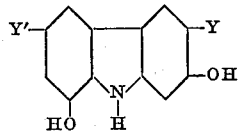

wherein "Y" and "Y'" stand both for hydrogen or both for a sulfonic acid group, the steps which comprise sulfonating carbazole at a temperature between about 10° and about 75° C. with a sulfuric acid containing a water-binding agent at least in a quantity sufficient for binding the water liberated in the reaction, and melting the carbazole-2.3.6.8-tetrasulfonic acid formed with a caustic alkali at a temperature between about 200° and about 260° C.

9. In the process of preparing carbazole compounds of the general formula:

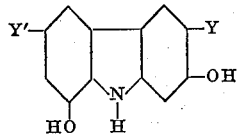

wherein "Y" and "Y'" stand both for hydrogen or both for a sulfonic acid group, the steps which comprise sulfonating carbazole at a temperature between about 10° and about 75° C. with sulfuric acid containing $SO_3$ at least in a quantity sufficient for binding the water liberated in the reaction, and melting the carbazole-2.3.6.8-tetrasulfonic acid formed with caustic potash at a temperature between about 200° and about 260° C.

ALFRED BERGDOLT.
ALBERT SCHMELZER.